(12) United States Patent
Leube et al.

(10) Patent No.: US 12,478,249 B2
(45) Date of Patent: Nov. 25, 2025

(54) METHOD AND DEVICE FOR MEASURING THE VISION OF A PERSON

(71) Applicant: Carl Zeiss Vision International GmbH, Aalen (DE)

(72) Inventors: Alexander Leube, Aalen (DE); Eric Nehrbass, Aalen (DE); Simon Staudenmaier, Salach (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/595,704

(22) Filed: Mar. 5, 2024

(65) Prior Publication Data

US 2024/0206724 A1    Jun. 27, 2024

Related U.S. Application Data

(63) Continuation of application No. PCT/EP2022/079624, filed on Oct. 24, 2022.

(30) Foreign Application Priority Data

Oct. 25, 2021   (EP) ..................... 21204486

(51) Int. Cl.
*A61B 3/032*       (2006.01)
*G01S 13/74*       (2006.01)

(52) U.S. Cl.
CPC .............. *A61B 3/032* (2013.01); *G01S 13/74* (2013.01)

(58) Field of Classification Search
CPC ......... A61B 3/028; A61B 3/036; A61B 3/032; A61B 3/0285

(Continued)

(56) References Cited

U.S. PATENT DOCUMENTS 6,238,049 B1 *   5/2001   Griffin ................... A61B 3/028
                                                    351/243
7,872,635 B2 *   1/2011   Mitchell ................ A61B 3/113
                                                    345/44

(Continued)

FOREIGN PATENT DOCUMENTS

CN      111295129 A      6/2020
CN      112890761 A      6/2021

(Continued)

OTHER PUBLICATIONS

W. Wesemann et al., "Fotorefraktion—ein objektives Screening-Verfahren zur Refrationsbestimmung ] Photorefraction—an objective screening method for refraction determination]," Deutsche Optiker Zeitung DOZ, pp. 50 to 54, Nov. 1992.

(Continued)

*Primary Examiner* — Zachary W Wilkes

(74) *Attorney, Agent, or Firm* — Tautz & Schuhmacher LLC; Georg Hasselmann

(57) ABSTRACT

Methods and devices for measuring the vision of a person are provided The method includes determining a distance between a measurement device and the person. The distance is determined by communicating between a first wireless communication interface of the measurement device and a second wireless communication interface of a portable device on the person. Then, the vision measurement is performed based on the distance.

14 Claims, 2 Drawing Sheets

(58) Field of Classification Search
USPC .................................................. 351/246, 239
See application file for complete search history.

(56) References Cited

U.S. PATENT DOCUMENTS

| | | | | |
|---|---|---|---|---|
| 7,962,150 | B2* | 6/2011 | Hertzog | G01S 5/10 |
| | | | | 455/456.2 |
| 8,702,238 | B2 | 4/2014 | Berry et al. | |
| 9,033,508 | B2* | 5/2015 | Bartlett | A61B 3/0066 |
| | | | | 351/210 |
| 9,066,667 | B1* | 6/2015 | Berme | A61B 3/032 |
| 9,173,557 | B2* | 11/2015 | Clark | A61B 3/1035 |
| 9,236,024 | B2* | 1/2016 | Coon | A61B 3/111 |
| 9,532,709 | B2* | 1/2017 | Carrafa | A61B 3/0041 |
| 9,770,165 | B2* | 9/2017 | Carrafa | A61B 3/0025 |
| 10,314,475 | B2 | 6/2019 | Carrafa | |
| 10,702,148 | B2 | 7/2020 | Breuninger et al. | |
| 10,736,545 | B1* | 8/2020 | Berme | A61B 3/028 |
| 10,952,605 | B1* | 3/2021 | Rubinfeld | A61B 3/0083 |
| 11,179,031 | B1* | 11/2021 | Rubinfeld | G06T 7/50 |
| 11,246,482 | B2 | 2/2022 | Lane et al. | |
| 11,751,761 | B1* | 9/2023 | Rubinfeld | A61B 3/08 |
| | | | | 351/222 |
| 12,220,169 | B2* | 2/2025 | Prevoo | A61B 3/032 |
| 2004/0227699 | A1* | 11/2004 | Mitchell | A61B 3/113 |
| | | | | 345/44 |
| 2010/0225541 | A1 | 9/2010 | Hertzog et al. | |
| 2015/0009475 | A1* | 1/2015 | Clark | A61B 3/103 |
| | | | | 351/239 |
| 2016/0338583 | A1 | 11/2016 | Uchida | |
| 2018/0125352 | A1* | 5/2018 | Schmid | A61B 3/0025 |
| 2021/0059517 | A1 | 3/2021 | Solanki et al. | |
| 2021/0275012 | A1* | 9/2021 | Prevoo | A61B 3/032 |

FOREIGN PATENT DOCUMENTS

| | | |
|---|---|---|
| CN | 112914494 A | 6/2021 |
| CN | 113057575 A | 7/2021 |
| EP | 3651410 A1 | 5/2020 |
| WO | 2016196803 A1 | 12/2016 |
| WO | 2018002332 A2 | 1/2018 |

OTHER PUBLICATIONS

A. Guenther et al., "Measuring round trip times to determine the distance between WLAN nodes," International conference on research in networking, pp. 768 to 779, May 2005.

Industrial Norm "Ophthalmic optics—Spectacle lenses—Vocabulary (ISO 13666:2012)," German and English version EN ISO 13666:2012, Oct. 2013.

V. Sark et al., "Achieving Millimeter Precision Distance Estimation using Two-Way Ranging in the 60 GHz Band," European Conference on Networks and Communications, pp. 310 to 314, Jun. 2019.

C. Sang et al., "Numerical and Experimental Evaluation of Error Estimation for Two-Way Ranging Methods" Sensors, vol. 19, No. 3, pp. 1 to 28, Feb. 2019.

802154-2020—IEEE Standard for Low-Rate Wireless Networks, abstract, Mar. 10, 2023.

80211bd-2022—IEEE Standard for Information Technology—Telecommunications and Information Exchange between Systems Local and Metropolitan Area Networks—Specific Requirements "Part 11: Wireless LAN Medium Access Control (MAC) and Physical Layer (PHY) Specifications Amendment 5: Enhancements for Next Generation V2X," abstract, Jul. 23, 2020.

European Search Report issued in EP 21204486.1, to which this application claims priority, mailed Apr. 4, 2022.

International Search Report and Written Opinion issued in PCT/EP2022/079624, to which this application claims priority, mailed Jan. 31, 2023.

Office Action by the Chinese Patent Office (CNIPA) issued in CN 202280053010.4, which is a counterpart hereof, mailed on May 22, 2024, and English-language translation thereof.

Office Action by the Chinese Patent Office (CNIPA) issued in CN 202280053010.4, which is a counterpart hereof, issued on Nov. 22, 2024, and English-language translation thereof.

* cited by examiner

METHOD AND DEVICE FOR MEASURING THE VISION OF A PERSON

CROSS REFERENCE TO RELATED APPLICATIONS

This application is a continuation application of International patent application PCT/EP2022/079624, filed on Oct. 24, 2022 and designating the U.S., which claims priority to European patent application EP 21 204 486.1, filed on Oct. 25, 2021, both of which are hereby incorporated by reference in their entireties

TECHNICAL FIELD

The present application relates to methods and devices for measuring the vision of a person.

BACKGROUND

Measurements of the vision of a person (shortly referred to as vision measurements) are generally used to determine properties of the eye related to the sense of sight. Those properties characterize how well a person can perceive his or her surroundings. For example, vision measurements, such as those performed by an optician or doctor, may determine the refraction of the eye in terms of sphere, cylinder, and axis (see 11.2, 12.5 and 12.6 of DIN EN ISO 13666: 2013-10), as well as the visual acuity, which is a measure of the spatial resolution or color sensing of at least one eye.

Both subjective refraction methods relying on a feedback of a person examined and objective refraction methods operating without feedback are known. For example, in a common subjective refraction method the person to be examined views optotypes printed on a sheet or displayed on a screen in various sizes, and gives feedback which optotypes (for example down to which size) he/she can still recognize. Optotypes, in this respect, refer to any symbols, letters, numbers, or the light which the person has to recognize in such a test. An example for optotypes are Snellen figures or the Landolt C.

Examples for an objective refraction includes isotropic photorefraction and eccentric photorefraction. These methods are described for example in W. Wesemann and H. I. Wesemann "Fotorefraktion—ein objektives Screening-Verfahren zur Refraktionsbestimmung [Photorefraction—an objective screening method for refraction determination]," DOZ-Deutsche Optiker Zeitung 11/92, pages 50 to 54.

Conventionally these methods are performed by an optician or doctor using specific devices and components constructed for the respective measurement.

In recent years, there has been a trend to use home computers, laptops, and mobile devices like smartphones or tablet PCs for refraction and visual acuity measurements, with the aim to enable persons to measure their eye refraction or visual acuity themselves without the aid of an optician or doctor, even if these methods may also be performed by an optician or doctor. For example, for subjective refraction, U.S. Pat. No. 10,314,475 B2 and U.S. Pat. No. 8,702,238 B2 describe corresponding approaches, where optotypes are displayed on a computer screen. For objective refraction using eccentric photorefraction, WO2018/002332 A2 discloses various approaches for eccentric photorefraction using a smartphone.

For both types of measurements (subjective or objective), the distance of the person to the measurement device is important. In case of subjective refraction methods, it is easy to understand that the closer the person is to the optotypes, the easier it is usually to recognize them. Moreover, a distinction may need to be made between near field vision (i.e., the eyes of the person being close to the optotypes, e.g., 1 m or less) and far field vision (i.e., the eyes of the person being further away from the optotypes, e.g., 2 m or more or 3 m or more). Therefore, the above-cited references each include approaches for determining and correcting the distance. For example, U.S. Pat. No. 10,314,475 B2 uses a computer displaying optotypes and a portable device held by the user. A camera of the portable device takes a picture of a screen of the computer, and based on the dimensions (in pixels) of the screen in the image taken, the distance may be determined. Based on this information, a size of the optotypes displayed may be adjusted. In U.S. Pat. No. 8,702,238 B2 various approaches regarding distance determination are mentioned, including inputting information by the user. In other approaches, the person to be examined has to take a predefined number of steps away from the screen. Obviously, the distance thus obtained depends on the size of the steps the person makes.

In eccentric photorefraction, the distance is directly used for the calculation of the refraction based on the measurement, as described in WO 2018/002332 A2. Also, WO 2018/002332 A2 discusses various possibilities of distance measurements, also including inputting information, measurements by a camera (for example of an object with known dimensions like a credit card) and the like.

The approaches for distance measurement disclosed in these documents may be comparatively inaccurate (for example, if the user has to estimate the distance or has to take a predefined number of steps) and may be difficult to repeat or perform continuously. For example, if the person has to hold an object of known dimensions like a credit card besides his/her head, he/she will usually do so once for the distance measurement, and then put the object away again. If the distance then changes during the measurement, due to an inadvertent movement of the person, for example, this is not recognized.

SUMMARY

It is an object underlying the present application to provide methods and devices for vision measurements with improved distance measurement, which are sufficiently accurate and may be performed repeatedly for essentially continued monitoring.

This object is achieved by a method for determining the vision of a person as disclosed herein. Further exemplary embodiments of the method and device, as well as a system including such a device, are also disclosed. Furthermore, a method for manufacturing lenses based on the vision measurement is provided.

According to an aspect of the disclosure, a method for measuring the vision of a person is provided, comprising:
   determining a distance between a measurement device and the person; and
   performing the measurement of the vision based on the distance.

The method is characterized in that determining the distance comprises determining the distance by communicating between a first wireless communication interface of the measurement device and a second wireless communication interface of a portable device at the person.

A measurement of the vision of a person, shortly referred to as vision measurement, as described herein, refers to a non-invasive measurement method for determining properties of one or both eyes of the person, for example refraction, visual acuity, contrast sensitivity, astigmatism, color sensitivity, dynamic acuity or combinations thereof. Performing the vision measurement based on the distance means that the distance influences the measurement in some manner. Examples will be given further below.

Unlike the conventional methods explained above, according to the above method the distance is determined by communicating between first and second wireless interfaces.

A wireless communication interface, as used herein, refers to a component which enables wireless data transfer between devices. Most computers, laptops, smartphones, tablet PCs, smartwatches or the like include one or more wireless communication interfaces. Examples of such wireless communication interfaces include Bluetooth, which is specified in various versions on www.bluetooth.com, wireless local area network (WLAN) as specified in the standard family IEEE802.11 (for example b, g, m, ac, ax, ad), or Ultra-Wideband (UWB) communication as specified in IEEE802.15.4a and IEEE802.15.4z. Distance measurements using Bluetooth is based on the so called "received signal strength indicator" (RSSI). Distance measurements regarding the LAN technology are generally described in A. Günther and C. Höhne, proc. of networking 2005, Waterloo, Canada, may 2005. For the 60 gigahertz band as for example used by IEEE802.11ad, distance measurement is described in V. Sark et al. "Achieving Millimeter Precision Distance Estimation using Two-Way Ranging in the 60 GHz Band," DOI:10.1109/EuCNC.2019.8801999.

Distance determination using Ultra-Wideband technology is for example described in U.S. Pat. No. 7,962,150 B2 or in EP 3651410 A1. General approaches to distance estimation using wireless communication interfaces is described in C. L. Sang et al. "Numerical and Experimental Evaluation of Error Estimation for Two-Way Ranging Methods" Sensors 2019, vol. 19, 616.

The above method uses that, as mentioned above, many devices include corresponding wireless communication interfaces. For example, many people nowadays carry a smartphone or even a smartwatch, which may serve as the portable device on the person (or at the person) that communicates with a measurement device like a computer or a laptop programmed accordingly to determine the distance. In this way, no specific hardware is required for distance measurements, but merely a corresponding programming of the devices is needed.

Of the above wireless communication interfaces, Ultra-Wideband interfaces are typical as they provide a high accuracy.

Typically, the determining of the distance is performed repeatedly, such that an essentially continuous monitoring of the distance becomes possible. "Essentially continuous" means that distance measurements are performed repeatedly one after the other in short intervals, e.g., intervals of 1 second or less, 100 ms or less or shorter. In this way, the distance is not measured only once for example at the beginning of a measurement as in some conventional solutions, but also changes of the distance during the measurement (for example due to movement of the person) may be taken into account.

Performing the vision measurement based on the distance may be performed in various ways, depending on the type of measurement of a particular application.

For example, for subjective refraction measurements optotypes may be displayed on a screen of the measurement device, where the size of the optotypes is set depending on the distance, as per se, with another type of distance measurement, is described in U.S. Pat. No. 10,314,475 B2 mentioned above. In other examples, the vision measurement may require a specific distance, and if the determined distance does not match the required distance, the measurement device, the portable device or both may output instructions to the person to move to the correct distance. In yet other approaches, like the eccentric photorefraction mentioned initially, the calculation of the measurement result itself may use the distance as a parameter.

For example, for measuring vision parameter like contrast vision the contrast of the optotypes is varied while the distance is kept fixed. However, herein the described distance measurement, in particular the essentially continuous monitoring mentioned above, provides an active control mechanism to check whether the distance for the contrast test is still correct during test execution. To assess color vision, the color of the optotypes is varied. To assess astigmatism, the orientation of the optotypes is varied. To assess dynamic acuity, the velocity of the optotype is not zero and is varied. In all tests, the distance measurement can be used to control the distance, e.g., that a predefined distance is kept, to adjust an optotype parameter like size depending on the distance measurement, or both.

Typically, the measurement device may be controlled by the portable device using the first and second communication interfaces. In this way the person may send commands to the measurement device using the portable device, for example to start the measurement. This may for example be done by pressing a button on the portable device like a button displayed on a touch screen of the portable device, or by audio input using a microphone of the portable device. Conventional portable devices like smartphones, tablets or smartwatches include such input modalities.

In some exemplary embodiments, the method additionally includes determining an orientation between the portable device and the measurement device, wherein the vision measurement is additionally based on the orientation. Such orientation measurements are possible using the above described wireless communication standards. The orientation measurement essentially uses that signal strength received at a receiving device (portable device if the measurement device is the transmitter, measurement device if the portable device is the transmitter) depends on a mutual antenna orientation of the two devices. For example, in this way the head orientation of the person may be determined, by holding the portable device to the head in a specific manner. This is particular typical if the portable device includes earphones, which nowadays also often includes Ultra-Wideband wireless communication interfaces. In this way, the person does not have to hold the portable device in a particular manner, but merely needs to wear the earphones in a normal fashion. The orientation of the head is important for measurements involving astigmatism, as here the eye refraction is not rotationally symmetric. In other cases, for example when the portable device is a smartwatch, orientation of the hand or arm of the person may be measured. The orientation of the hand or arm may be used to control the measurement as a kind of gesture control.

For example, performing the measurement of the vision based on the determined orientation may comprises at least one of the group consisting of:
  displaying optotypes with an orientation based on the determined orientation. For example, the orientation of the optotypes may be adapted to the orientation of the head, or controlled by the orientation of the hand or arm.

calculating a measurement value based on the determined orientation. For example, calculation of an axis of astigmatism may be performed based on the orientation of the head, or the orientation of the hand in case the hand in turn controls the orientation of the optotypes, or outputting instructions to the person (42) to rotate if the determined orientation does not correspond to a target orientation, for example to correct the orientation of the head, or receiving instructions or commands from the person by changing the orientation of the hand or arm.

In another exemplary embodiment, a method for manufacturing a spectacle lens is provided, comprising performing an measurement of a vision of a person based on any of the methods above, and manufacturing the spectacle lens based on the result of the measurement of the vision. For example, when the measurement of the vision is a refraction measurement, spectacle lenses correcting the refraction of the eye may be manufactured.

Furthermore, a measurement device for measuring the vision of a person is provided, comprising:

a distance determination component configured to determine a distance between the measurement device and the person, and a measurement component configured to perform a measurement of a vision of the person based on the distance.

The device is characterized in that the distance determination component comprises a first wireless interface configured to determine the distance by communicating with a second wireless communication interface of a portable device at the person.

The above explanations for the method also apply to the measurement device, including variations thereof. For example, the measurement component may include a display for displaying optotypes for a subjective refraction measurement, or may include a camera and processor for performing an objective refraction measurement like an eccentric photorefraction.

Furthermore, a system including the measurement device and the portable device is provided. The measurement device may for example include a personal computer (PC) or a laptop, computer, or a mobile device like a tablet or smartphone. In this case, a computer program may be provided to be executed on the measurement device, causing execution of any of the methods discussed above. The portable device as mentioned above may for example include a smartphone, a smartwatch, a tablet PC or also devices like earphones. Therefore, the techniques discussed herein may be performed also to smartphones or a tablet PC and a Smartphone.

BRIEF DESCRIPTION OF THE DRAWINGS

The disclosure will now be described with reference to the drawings wherein.

DETAILED DESCRIPTION OF EXEMPLARY EMBODIMENTS

Figure 1:
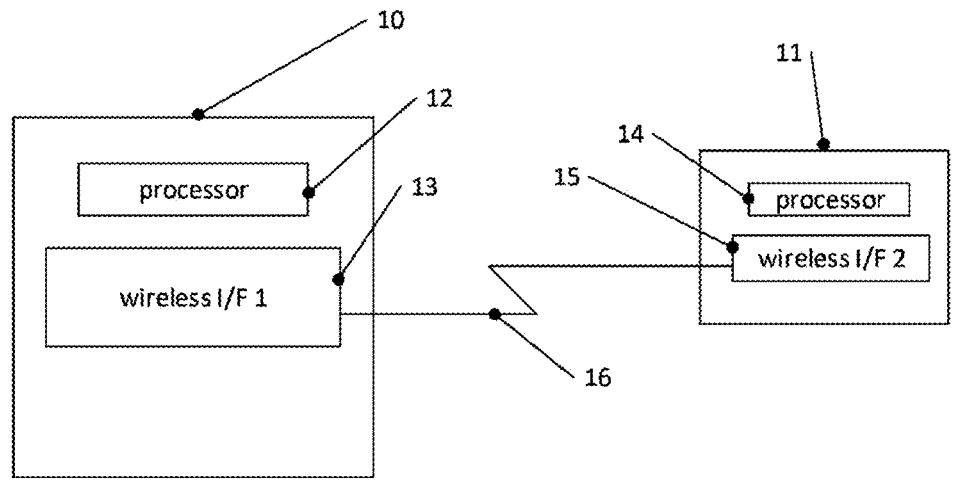
FIG. 1 shows a block diagram of a system according to an exemplary embodiment.

FIG. 1 shows a system according to an exemplary embodiment, including a measurement device 10 and a portable device 11. Measurement device 10 is schematically shown as including at least a processor 12 and a first wireless interface 13. Measurement device 10 may for example be a computer like a desktop computer together with a monitor or a laptop computer. Portable device 11 is schematically shown as including at least a processor 14 and a second wireless interface 15 communicating with first wireless interface 13 as indicated by a line 16. First and second wireless interfaces 13, 15 may be Ultra-Wideband (UWB) interfaces as described above. Portable device 11 may be smartphone, tablet PC, smartwatch or may be a set of earphones.

Figure 2:
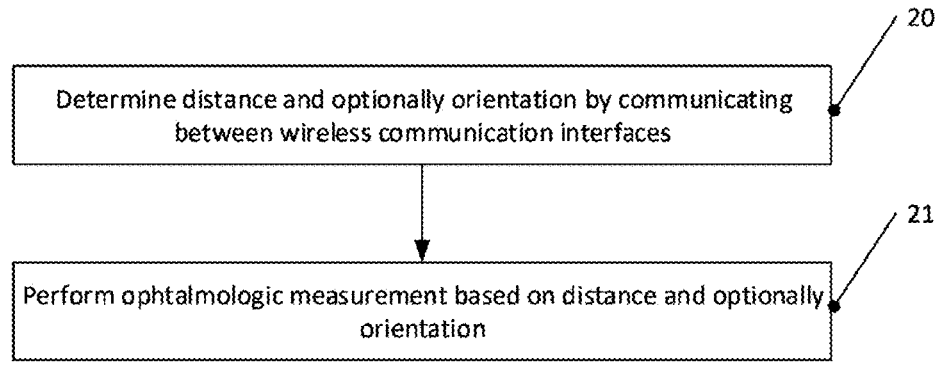
FIG. 2 shows a flow chart illustrating a method according to an exemplary embodiment.

With the system of FIG. 1, a method according to an exemplary embodiment as shown in FIG. 2 may be performed. In step 20, the method comprises determining the distance between measurement device 10 and portable device 11 by communicating between wireless interfaces 13, 15. Portable device 11 during the measurement is at the person to be examined, for example worn by the person, so such that the distance determined corresponds to the distance between measurement device 10 and the person. At step 21, the method comprises performing a vision measurement based on the distance. Optionally, at step 20 additionally the orientation between measurement device 10 and portable device 11 may be determined, and in this case the vision measurement at step 21 may additionally be performed based on the orientation. Examples for measurements have been described above in the summary portion and also will be described further below.

Figure 3:
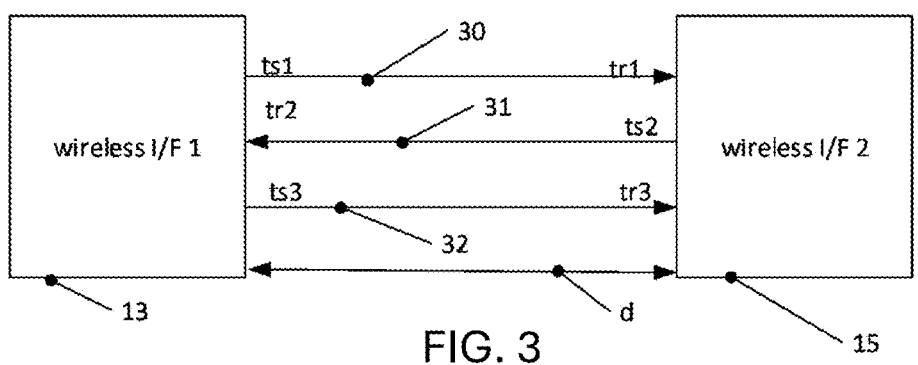
FIG. 3 shows a diagram illustrating distance measurement using wireless communication interfaces.

The determination of the distance may be performed by time of flight measurements exchanging signals between the wireless interfaces. Details are described in the above-cited publication C. L. Sang et al. and will be briefly described referring to FIG. 3.

At a first transmit time ts1, first wireless interface 13 transmits a signal 30 to second wireless interface 15, which received the signal at a first receive time tr1. After an internal processing time, second wireless interface 15 replies with a signal 31 at a second transmit time ts2, which is received by first wireless interface 13 at a second receive time tr2. After an internal processing time, first wireless interface 13 transmits a further signal 32 at a transmit time ts3, which is received by second wireless interface 15 at a time tr3.

The round trip time is the time between transmitting of a signal by one of the wireless interfaces and receiving a signal again by that same wireless interface. A first round trip time in FIG. 3 therefore is tr2−ts1, and a second round trip time is tr−ts2. Each round trip time is two times the time of flight $T_{tof}$, i.e., the time the electromagnetic wave takes from one of the wireless interfaces 13, 15 to the other of the wireless interfaces 13, 15, plus the processing time by the other device. Therefore, tr2−ts1=2×$T_{tof}$+ts2−tr1, and tr3−ts2=2×$T_{tof}$+ts3−tr2. The time differences, i.e., ts2−tr1 or ts3−tr2, can be measured at the respective wireless interface and communicated to the other wireless interface via data transfer. From this, the time $T_{tof}$ may be calculated, and by multiplying with the speed of light (electromagnetic waves travel with the speed of light) the distance may be determined. As mentioned, further details regarding these calculations can be found in the above publication by C. L. Sang et al.

Figure 4:
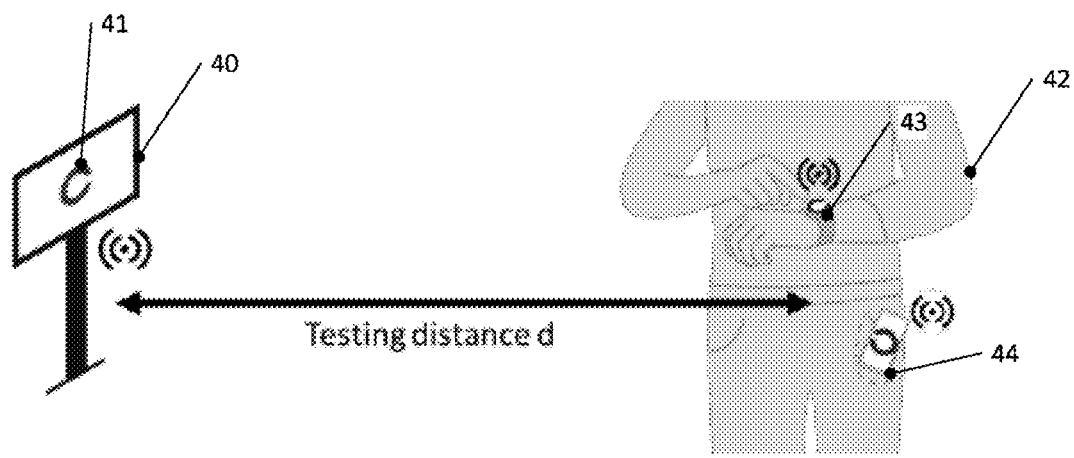
FIG. 4 illustrates a measurement scenario according to an exemplary embodiment.

FIG. 4 shows an application scenario of a system according to an exemplary embodiment. Of a measurement device, a screen 40 is shown displaying an optotype, in this case a circle with an opening, so called Landolt C, 41. A person 42 to be examined has a smartphone 44 in his/her pocket and wears a smartwatch 43. Both smartwatch 43, smartphone 44 and a combination of the two may serve as portable device. By communication between the measurement device and either smartphone 44 or smartwatch 43, the testing distance d may be measured as explained above. Furthermore, the user may control the measurement using smartwatch 43 or smartphone 44. For example, the person may start the measurement in this way, switch to a next optotype displayed or give feedback if he/she can recognize an optotype or not. As shown in FIG. 4, in this example the optotype is additionally displayed on smartphone 44.

Figure 5A:
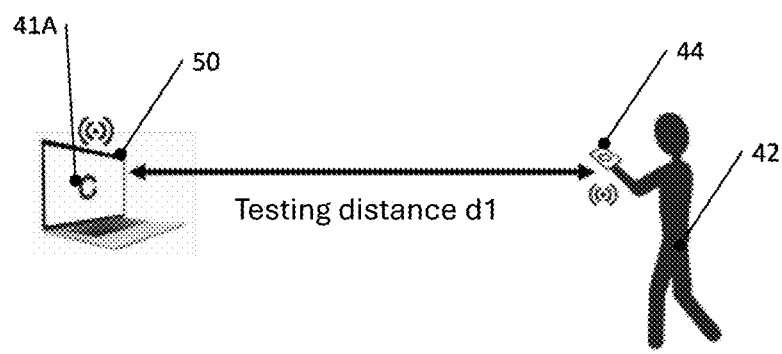
FIGS. 5A and 5B illustrate measurement scenarios according to exemplary embodiments.
Figure 5B:

FIGS. 5A and 5B show an example how the measurement may be performed based on the distance. In this case, a laptop 50 is used as the measurement device for displaying optotype 41 as in FIG. 4, and person 42 has smartphone 44 as an example for a portable device. A distance between laptop 50 and smartphone 44 is measured using corresponding wireless communication interfaces as explained above.

In FIG. 5A, the testing distance d1 is smaller than a testing distance d2 in FIG. 5B. Therefore, in this example, in FIG. 5A optotype 41 is displayed as optotype 41A, and in case of FIG. 5B optotype 41 is displayed as optotype 41B, which is larger than optotype 41A. In other words, in this case the size of the optotype displayed is adapted to the testing distance, where for larger testing distances larger optotypes are displayed.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for measuring the vision of a person, the method comprising:
   determining a distance between a measurement device and the person,
   wherein determining the distance includes determining the distance by communicating between a first wireless communication interface of the measurement device and a second wireless communication interface of a portable device on the person;
   performing measuring the vision with a measurement component of the measurement device based on the distance;
   determining an orientation between the measurement device and the portable device by communicating between the first wireless communication interface and the second wireless communication interface based on a signal strength of a signal communicated between the first wireless communication interface and the second wireless communication interface; and
   displaying optotypes with an orientation based on the determined orientation,
   wherein performing the measurement of the vision further comprises performing the measurement of the vision based on the determined orientation,
   wherein the first wireless communication interface and the second wireless communication interface are Ultra-Wideband communication interfaces,
   wherein determining the orientation includes determining an orientation of the head of the person with at least one of headphones worn by the person or with the portable device being held against the head of the person in a predetermined way.

2. The method of claim 1, wherein the determined orientation is indicative of an orientation of a body part selected from the group consisting of a head, a hand, and an arm of the person.

3. The method of claim 1, wherein performing the measurement of the vision based on the determined relative rotation comprises at least one of the group consisting of:
   calculating a measurement value based on the determined orientation;
   outputting instructions to the person to rotate if the determined orientation does not correspond to a target orientation; and
   controlling the measurement based on the determined orientation.

4. The method of claim 1, wherein the determining of the distance is performed repeatedly.

5. The method of claim 1, wherein performing the measurement of the vision based on the distance comprises at least one of the group consisting of:
   displaying optotypes with a size based on the distance;
   calculating a measurement value based on the distance; or
   outputting instructions to the person to move if the distance does not correspond to a target distance.

6. The method of claim 1, wherein the portable device controls the measurement device.

7. The method of claim 1, wherein determining the orientation includes determining the orientation of the head of the person with the headphones worn by the person.

8. The method of claim 1, wherein determining the orientation includes determining the orientation of the head of the person with the portable device being held against the head of the person in the predetermined way.

9. A method for manufacturing spectacle lenses, comprising:
   determining a distance between a measurement device and the person, wherein determining the distance includes determining the distance by communicating between a first wireless communication interface of the measurement device and a second wireless communication interface of a portable device on the person;
   performing measuring the vision with a measurement component of the measurement device based on the distance;
   determining an orientation between the measurement device and the portable device by communicating between the first wireless communication interface and the second wireless communication interface based on a signal strength of a signal communicated between the first wireless communication interface and the second wireless communication interface, wherein performing the measurement of the vision further comprises performing the measurement of the vision based on the determined orientation;

displaying optotypes with an orientation based on the determined orientation; and manufacturing the spectacle lens based on a result of the measurement, wherein the first wireless communication interface and the second wireless communication interface are Ultra-Wideband communication interfaces, wherein determining the orientation includes determining an orientation of the head of the person with at least one of headphones worn by the person or with the portable device being held against the head of the person in a predetermined way.

10. A measurement device for measuring a vision of a person, the measurement device comprising:
a distance determination component configured to determine a distance between the measurement device and the person; and
a measurement component configured to perform a measurement of the vision of the person based on the distance,
wherein the distance determination component comprises a first wireless interface configured to determine the distance by communicating with a second wireless communication interface of a portable device on the person,
wherein the measurement component is further configured to determine an orientation between the measurement device and the portable device by communicating between the first wireless communication interface and the second wireless communication interface based on a signal strength of a signal communicated between the first wireless communication interface and the second wireless communication interface, and wherein performing the measurement of the vision further comprises performing measurement of the vision based on the determined orientation,
wherein optotypes are displayed with an orientation based on the determined orientation,
wherein the first wireless communication interface and the second wireless communication interface are Ultra-Wideband communication interfaces, and
wherein determining the orientation includes determining an orientation of the head of the person with at least one of headphones worn by the person or with the portable device being held against the head of the person in a predetermined way.

11. The measurement device of claim 10, wherein the measurement component is configured to determine the distance repeatedly.

12. A system, comprising the measurement device of claim 10 and the portable device.

13. A computer program for a measurement device for measuring a vision of a person, which, when executed on the measurement device, causes the measurement device to:
determine a distance between the measurement device and the person,
wherein determining the distance includes determining the distance by communicating between a first wireless communication interface of the measurement device and a second wireless communication interface of a portable device on the person;
perform measuring the vision with a measurement component of the measurement device based on the distance;
determine an orientation between the measurement device and the portable device by communicating between the first wireless communication interface and the second wireless communication interface based on a signal strength of a signal communicated between the first wireless communication interface and the second wireless communication interface, wherein performing the measurement of the vision further comprises performing the measurement of the vision based on the determined orientation; and
display optotypes with an orientation based on the determined orientation,
wherein the first wireless communication interface and the second wireless communication interface are Ultra-Wideband communication interfaces, and
wherein determining the orientation includes determining an orientation of the head of the person with at least one of headphones worn by the person or with the portable device being held against the head of the person in a predetermined way.

14. A method for measuring the vision of a person, the method comprising:
determining a distance between a measurement device and the person,
wherein determining the distance includes determining the distance by communicating between a first wireless communication interface of the measurement device and a second wireless communication interface of a portable device on the person;
performing measuring the vision with a measurement component of the measurement device based on the distance; and
determining an orientation between the measurement device and the portable device by communicating between the first wireless communication interface and the second wireless communication interface based on a signal strength of a signal communicated between the first wireless communication interface and the second wireless communication interface;
wherein performing the measurement of the vision further comprises performing the measurement of the vision based on the determined orientation, wherein the measurement of the vision includes a measurement of astigmatism,
wherein the first wireless communication interface and the second wireless communication interface are Ultra-Wideband communication interfaces, and
wherein determining the orientation includes determining an orientation of the head of the person with at least one of headphones worn by the person or with the portable device being held against the head of the person in a predetermined way.

* * * * *